United States Patent
Picard

[19]

[11] Patent Number: 6,115,455
[45] Date of Patent: *Sep. 5, 2000

[54] METHOD AND APPARATUS FOR DYNAMICALLY CREATING MESSAGE MAILBOXES

[75] Inventor: Donald F. Picard, Medford, Mass.

[73] Assignee: Boston Technology, Inc., Wakefield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/743,792

[22] Filed: Nov. 5, 1996

[51] Int. Cl.<sup>7</sup> ...................................................... H04M 1/64
[52] U.S. Cl. .................... 379/67.1; 379/88.12; 379/88.22
[58] Field of Search ................................. 379/89, 67, 88, 379/93.24, 100.08, 67.1, 88.12, 88.13, 88.18, 88.22, 88.23, 88.25, 88.26, 88.27, 88.28

[56] References Cited

U.S. PATENT DOCUMENTS

| | | | |
|---|---|---|---|
| 4,932,042 | 6/1990 | Baral et al. | 379/67 |
| 5,199,062 | 3/1993 | von Meister et al. | 379/67 |
| 5,434,907 | 7/1995 | Hurst et al. | 379/88 |
| 5,570,414 | 10/1996 | Stern | 379/67 |
| 5,646,982 | 7/1997 | Hogan et al. | 379/89 |
| 5,781,614 | 7/1998 | Brunson | 379/90.01 |

FOREIGN PATENT DOCUMENTS 0 412 799 A2  2/1991  European Pat. Off. .
0 693 847 A2  1/1996  European Pat. Off. .

OTHER PUBLICATIONS

European Search Report, Application No. EP 97 30 8911.

Robert Suggett, "The Use of Voice Systems in the Hotel Market", Speech Technology, Feb. 1991, pp. 93–95.

*Primary Examiner*—Scott L. Weaver
*Attorney, Agent, or Firm*—Staas & Halsey LLP

[57] ABSTRACT

A system that dynamically creates a mailbox if the mailbox does not exist for a message at the time that the message is to be stored when dynamic mailbox creation is enabled. A system level process indicates that the mailbox exists and provides default subscriber information to a voice messaging application during the receipt of a message when a mailbox does not exist on the system for the recipient of the message and dynamic mailbox creation is enabled. At the time the message is to be stored the mailbox is created with the default subscriber information. The system checks for erroneous mailboxes by requesting confirmation of the recipient telephone number from the telephone system using a message waiting indication packet. This check can be performed before the mailbox is created when the mailbox address is available, while the message is being held before being stored, or it can be used to delete the mailbox after it is created. When the message is retrieved, the mailbox is initialized. Mailboxes that are not initialized and that are dynamically created are deleted after a mailbox expiration time period has elapsed.

21 Claims, 4 Drawing Sheets

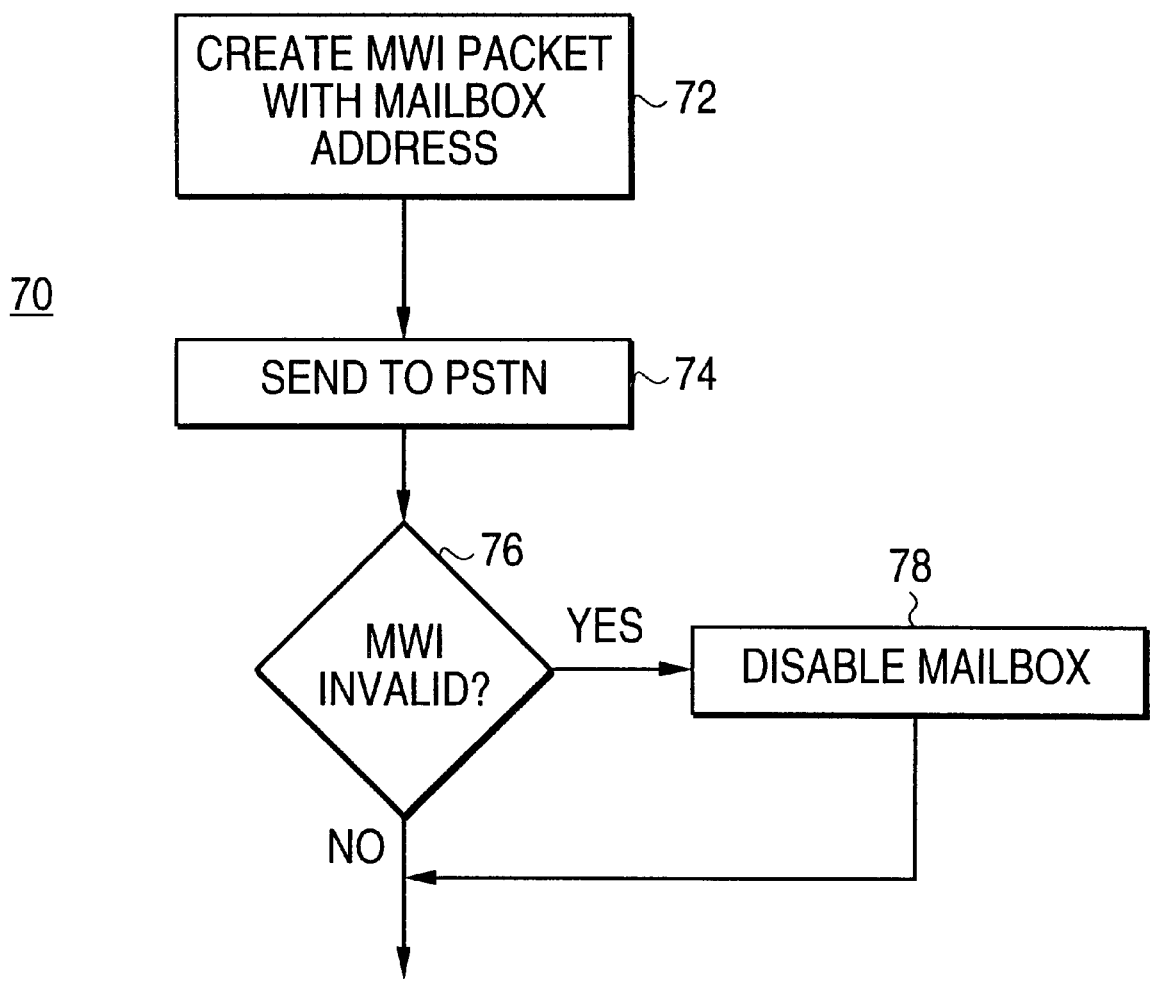

METHOD AND APPARATUS FOR DYNAMICALLY CREATING MESSAGE MAILBOXES

BACKGROUND OF THE INVENTION

1. Field of the Invention

The present invention is directed to dynamically creating a message mailbox, such as a voice mailbox, as the mailbox is needed and, more particularly, to a system for creating a system-wide mailbox at the system or platform level and at the time the mailbox is actually needed.

2. Description of the Related Art

Conventional systems require that a message mailbox, such as a voice mailbox, a facsimile mailbox, a video mailbox, an e-mail mailbox, etc., be created and activated prior to the mailbox being used by a subscriber or callers of the subscriber. That is, conventional systems require that a service provider "provision" mailboxes on a system before the system allows the mailbox to receive messages. The provisioning of mailboxes can be accomplished in two general ways: 1. create all the mailboxes that will be needed ahead of time, that is, assume that every telephony customer has a mailbox (universal provisioning); or 2. require that a subscriber contact a customer service representative to subscribe to the service, with the customer service representative creating and activating the mailbox. The first method wastes resources because typically much less that 50% of a customer base subscribes to a voice mail service. The first method also slows performance because a very large set of subscriber records must be searched each time a mail box is accessed. The second method involves a customer service agent, which is costly and time consuming.

Systems have been produced in which a voice mail application program creates a mailbox upon call arrival at the voice mail system if the mailbox does not exist. In such systems where mailboxes are created without exception, the voice mail system must be assured that the system receives only calls that are destined to subscribers of the voice mail system, i.e. the system does not receive calls that are destined to non-subscribers. The problem in such systems is that all call arrivals create a mailbox, even when a called number is not that of a subscriber, (eg. a wrong number was dialed or the call is to a pay telephone) or the calling party is not a subscriber (eg. a pay telephone is the source of the call). Because the mailbox is created upon arrival, these systems also create a mailbox even when the calling party decides not to leave a message or hangs up after a few seconds of silence. This created mailbox is permanent and remains on the system even if a message is not stored in the mailbox. These systems, like the universal provisioning systems, create mailboxes that are not needed, which wastes system resources.

It is also often the case that a subscriber to a voice mail service will want to and some service providers would prefer to allow subscribers to send or leave messages for non-subscribers or for subscribers of other voice mail systems ("non-local subscribers") for an extra fee. In such situations it is not practical to provision for all possible message recipients as discussed above.

A problem with, automatically created mailboxes is that the process can be subject to "hackers". A hacker could set up a mailbox for a pay telephone and thereafter send and receive messages without being billed.

Another problem associated with automatically created mailboxes is that the number of recipients may be incorrect.

Many telephony service providers are considering the deployment of universal messaging systems that provide voice mail messaging service as part of the telephone subscribers' basic service. In such systems, if the mailboxes are created by service agents, the administrative burden of creating a mailbox for each subscriber using service agents is also great.

What is needed is a system that automatically and dynamically creates a mailbox as the mailbox is actually needed for valid telephone numbers without the previously required administrative burden.

SUMMARY OF THE INVENTION

It is an object of the present invention to provide a mailbox creation system that creates a mailbox when it is actually needed, that is, when a message exists to be stored for a valid, called number that does not already have a mailbox.

It is another object of the present invention to allow customers to use a messaging system in a natural way (eg. inputting the mailbox numbers of people to whom they want to send messages), and to have the messaging system automatically create mailboxes for valid numbers that were input and that do not already have mailboxes.

It is an additional object of the present invention to dynamically create a mailbox when one has not existed before so that a message can always be left.

It is a further object of the present invention to verify that a mailbox being created is valid.

It is also an object of the present invention to create mailboxes only for telephone numbers that are to be provided with messaging service.

It is an object of the present invention to remove dynamically created mailboxes that do not have their messages retrieved within a predetermined time period.

The above objects can be attained by a system that provides default subscriber information to a voice messaging application during the receipt of a message whenever a mailbox does not exist on the system for the recipient. The message for the mailbox is temporarily held until the message must be stored in a mailbox. Then, if necessary, the mailbox is created and the message is stored therein. The system checks for erroneous mailboxes by requesting confirmation of the recipient telephone number from the telephone system. This check can be performed before the mailbox is created, while the message is being held, or it can be used to delete the mailbox after it is created.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts a mailbox validation process.

DESCRIPTION OF THE PREFERRED EMBODIMENTS

Figure 1:
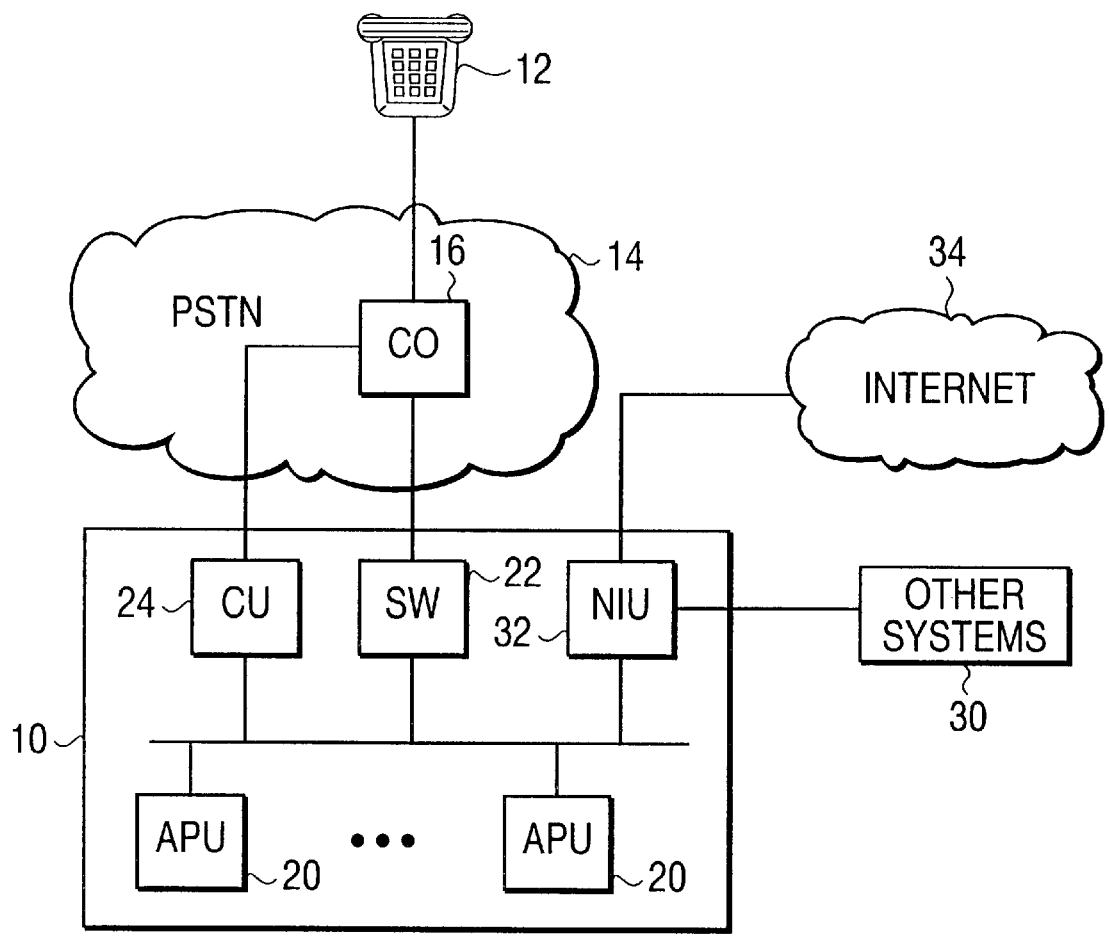
FIG. 1 depicts a typical voice mail system to which the present invention can be applied.

A message storage and retrieval "platform" or system 10, such as illustrated in FIG. 1, can have many sources of messages. The typical message is produced by a user, a "calling party", using a telephone 12 to telephone another person, a "called party", over a public switched telephone network (PSTN) 14. In the typical call flow the call is handled by a central office (CO) switch 16 until the called party does not answer or a busy is detected by the CO switch 16. At that time the call is transferred to the messaging system 10, where the call is routed to one of several application processing units (APU) 20 by a routing device such as a digital switch (SW) 22. The APU 20 performing a messaging function or process (such as voice mail, facsimile mail, call answering, etc.) typically checks with and obtains a mailbox address for a message to be recorded from a control unit (CU) 24 or some platform-level process. The APU 20 stores the message and informs the CU 24 where the message is stored. In this transaction the telephone number of the called party can be provided via a signaling path (using a well-known communication protocol, such as SMDI, SS7, ISDN, DID or ANI) between the CO 16 and the CU 10 (and the CU 24 provides the number to the APU 20) or the number can be provided directly to the APU 20 by the calling party entering the called telephone number again during call answering and messaging operations performed by the APU 20. The entering of the telephone number by the calling party can also occur when a subscriber listening to stored messages decides to send or forward a message to another subscriber.

A message can also be received as a "transferred message" (using a well known protocol, such as AMID-Analog or AMIS-Digital) that was originally recorded by another message recording system 30. Such transferred messages typically arrive via a network processing unit or network interface unit 32 and are typically processed in much the same manner as messages received through the APU 20.

Messages can also be recorded through or transferred over other types of networks such as the Internet 34. These messages can be from a telephone or from a computer. (See U.S. Pat. Nos. 5,029,199; 5,193,110; 5,260,990; 5,263,080; 5,402,472; 5,475,748; 5,493,607; 5,519,766 and 5,008,926, and U.S. application entitled A System For Accessing Multimedia Mailboxes And Messages Over The Internet And Via Telephone, having U.S. Ser. No. 08/743,793, all incorporated by reference herein).

Figure 2:
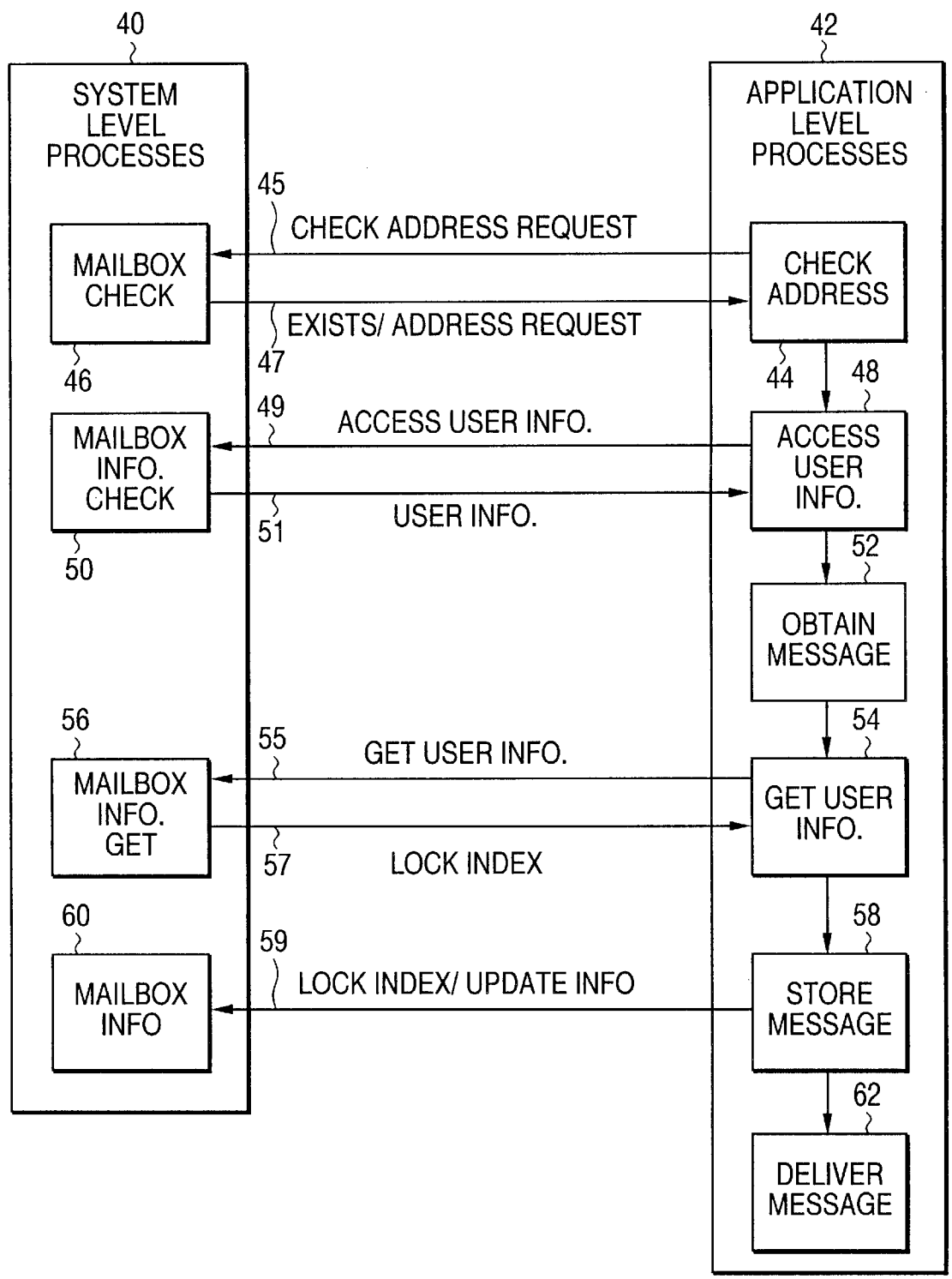
FIG. 2 illustrates the process performed in accordance with the present invention.

As illustrated in FIG. 2, typical messaging systems, such as the preferred CO ACCESS® system and/or the Access NP™ system available from Boston Technology, Inc. of Wakefield, Mass., have a system-level process 40 that interacts with an application-level process 42 to perform the messaging operation. In distributed systems, such as shown in FIG. 1, the system level process 40 typically runs on the CU 24 or on a database processing unit (not shown) or possibly on both while the application level process 42 runs on the APU 20 or the NIU 32. However, in systems that are not distributed the same unit may be executing all the processes.

During a messaging operation, a mailbox address (typically a called party telephone number, an email address, etc., plus a "domain" identifier) for a message to be stored arrives at the application process 42 from one of the sources noted above. We will assume for the purpose of this discussion that a mailbox does not exist on the system 10 for this address. The message associated with the address can arrive at the same time (in the case of a network message), later (in the case of a later recorded message) or before (in the case of a recorded message to be forwarded) the address is actually received. After the address has arrived, a "check address" process 44 of the application process 42 performs an operation to determine whether the mailbox address is valid. In this operation the check address process 44 sends a "check address" request 45, which includes a mailbox address (usually the telephone number), to a "mailbox check" process 46 within the system-level process 40. The mailbox check process 46 accesses a subscriber database (not shown) and returns a binary indicator to process 44 indicating whether a mailbox exists for the mailbox address. In typical systems the mailbox check process 46 returns a negative indicator whenever the mailbox was not provisioned and a positive indicator when the mailbox does exist. In the present invention, the mailbox check process 46 returns a positive indicator 47, indicating that a mailbox exists, even though a mailbox does not exist, whenever the system is configured to dynamically create mailboxes, i.e., dynamic mailbox creation is in effect.

Once the existence of the mailbox has been checked, the application level process (access user information) 40 typically executes an "access user information" process 48 that accesses user information for this mailbox. This user information is sometimes called a subscriber profile. The user information, or subscriber profile, indicates the status of the mailbox, that is, whether the mailbox has been activated, whether the subscriber is being provided with a level of service that includes voice messaging, etc. To do this, the access user information process 48 sends an "access user information" request 49, including the mailbox address, to a system level "mailbox information check" process 50. This process 50 typically returns a read-only copy of the user information when a mailbox has been activated, etc. and returns a failure indicator otherwise. However, in the present invention, the mailbox check process 50 returns user information 51 to the access user information process 48 by providing "default" user information whenever the mailbox does not exist and dynamic mailbox creation is enabled. The default user information includes, among other things, a default name announcement that announces the called telephone number as the name of the mailbox and states that the caller can leave a message. The default name announcement is similar to the one used when a subscriber fails to record a name announcement.

Once the user information has been accessed, the application-level process 42 performs an "obtain message" process 52 that typically obtains or gets the message that is to be stored. In the case of a voice message that is being recorded by a calling party this operation involves the APU 20 recording the message, allowing the calling party to change the message, mark it urgent, etc. In the case of a message transferred from another system 30 or a message from the Internet 34, this involves extracting the message from the network message received by the NIU 32. Because the mailbox has not yet been created at this step, if the calling party hangs up prior to recording a message, erases the message before exiting, the application detects that only silence has been recorded, etc. such that a valid message has not been recorded, the system exits to a wait state without completing the mailbox creation process and the message, if any, is discarded.

After a message is obtained that is to be stored, the application level process 42 performs a "get user information" process 54 that obtains the user information necessary to store the message. This process 54 essentially makes a request 55 ("get user information") to lock out other applications from obtaining the subscriber information, so that the process of storing the message and updating the message information for the subscriber can be executed without errors that can be caused in race situations. At the system level a "mailbox get information" process 56 typically obtains a lock index 57 for the subscriber record and returns it to the application. Prior to returning the lock index, at this step in process 56, the present invention creates a mailbox that has the default subscriber information previously sent to the application process 42. This creation process also flags the mailbox as having been dynamically created. As can be seen, the mailbox is created at the time that a request for the storage of the message is pending. Mailboxes are also created for any called parties that are on a group distribution list created by the calling party when the mailboxes do not exist. The mailboxes are created at the time the calling party activates the deliver message function after recording a message.

After the lock index 57 is received, the application level 42 performs a "storage process" 58 ("put user information") where: (1) the message is stored in a message file on a nonvolatile storage media, such as a hard disk; (2) a header for the message file is created; (3) the subscriber information is updated by increasing the message count by one; and (4) a pointer to the message file is stored in the subscriber list of messages. This updated information 59, along with the lock index, is returned to a "mailbox information put" process 60 at the system-level process 40 that typically updates the subscriber database with the updated information and releases the subscriber record lock.

The message is now ready for delivery 62 to the called party. The message can be delivered in one of several ways. The presence of the message can be indicated to the called party by, e.g., a "stutter dial tone" or a message light for a telephone. The called party can then retrieve the message, either by telephone or computer. The message can also be delivered by performing a conventional "outdial" process. Alternatively, the message can be transferred to another system 30 via the NIU 32. The message can be converted into an e-mail message and transferred through the Internet 34. The message can also be converted into a text message and sent by a text facility, such as facsimile (not shown).

The processes discussed above are stored in a storage medium of the system 10, such as on disk, in RAM, etc.

To insure that mailboxes are not created for telephone numbers that do not exist or for numbers that should not have mailboxes, such as pay telephone numbers, several different validity checks can be performed. During the check address process 44, the called party or message recipient's telephone number or network address can be checked against standard references. For example, a telephone number can be range-checked and checked for sufficient digits. A network address can be domain-name checked. It is also possible, using the outdial process, to dial the called party's number to check for an "operator intercept" tone that indicates that the telephone number is invalid. The system could also send a query to a separate database over a network such as the Internet 34. These approaches to verification could be used to avoid creating the mailbox and storing the message if the address is invalid.

Figure 3:
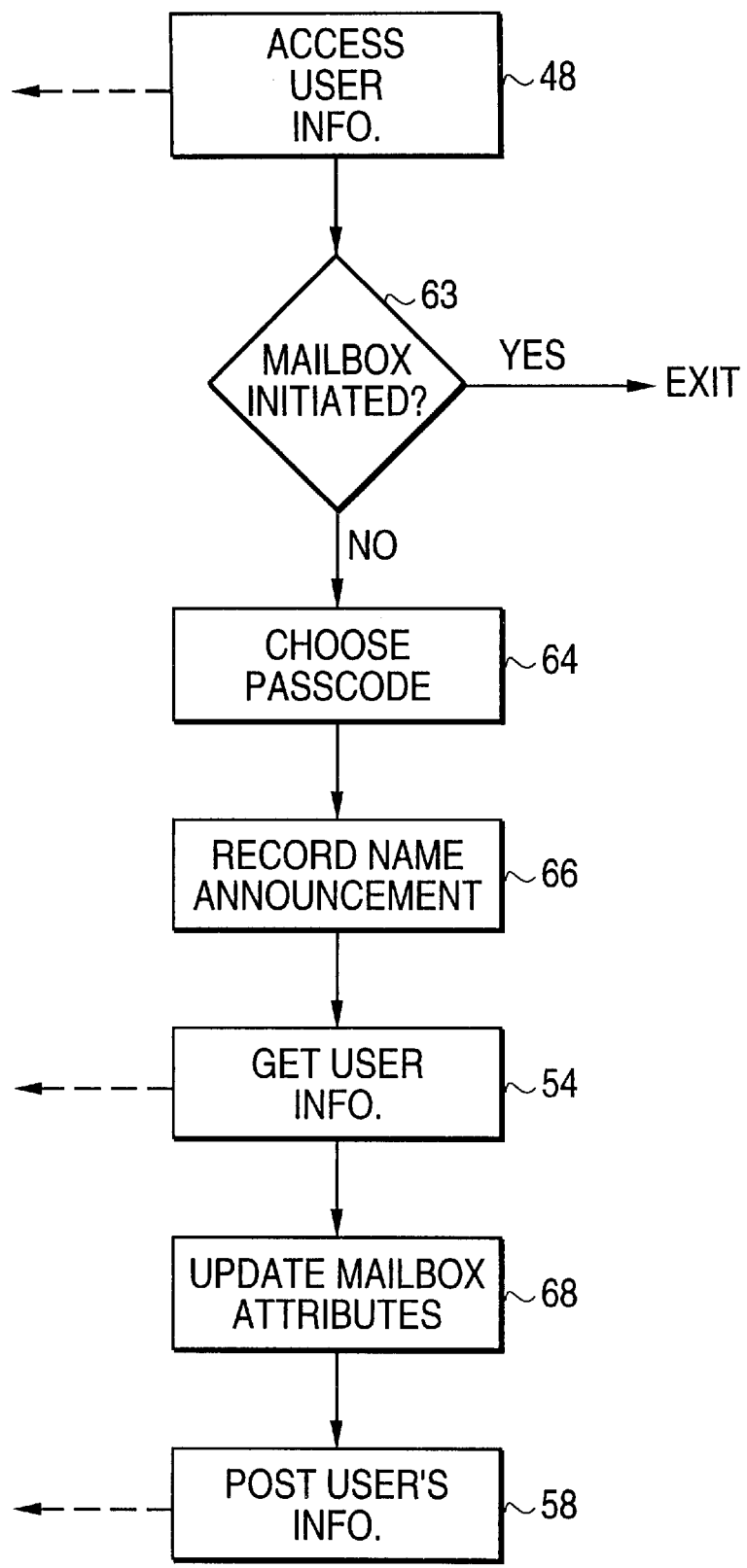
FIG. 3 depicts mailbox creation upon a login attempt.

The present invention will also create a mailbox for a subscriber that is attempting to log-in to the system when the system has not yet been provisioned with a mailbox for the subscriber by the system administrator. In this situation, the user attempting to log-in the system uses the telephone number, received via the methods previously noted. As previously discussed, the user information access process 48 accesses the user information to particularly obtain the information indicating whether the mailbox has been initiated as depicted in FIG. 3. The application level process checks 63 this information and if the mailbox has been initiated the process exits to the normal log-in procedure. If the mailbox has not been created the subscriber is given the opportunity to choose 64 a password and record 66 a name announcement. Once this is done the user information is obtained 54 as previously discussed. It is at this time that the mailbox is created and if the user stops before this step, such as by hanging up, the mailbox is not created. The mailbox information, such as passcode, name announcement and greeting, is updated 68. The updated information is then stored 58, as previously discussed.

To prevent a hacker from creating a mailbox from a pay telephone, the system only allows a mailbox to be created by a subscriber from their own telephone which is confirmed by the arrival of "automatic number identification" (ANI) information for the subscriber at the CU 24. In this situation, pay telephones, and other phones that are not authorized for a mailbox, must be configured not to submit ANI when calling message platforms.

After the mailbox is created and the message is stored, it is also possible to perform a validity check. The outdial process can be used to call the recipient's telephone and prompt the person answering the telephone to indicate whether a message stored for the number is valid. This can also be used as an opportunity to obtain the correct subscriber information to substitute for the default information. In a situation where the service provider levies a fee for the messaging service, this can be an opportunity to sign up a new subscriber. If the user does not subscribe to the service the mailbox can be flagged as receive-only and the called party billed for each message received, including the current or subsequent messages whenever they are retrieved.

It is also possible and preferable to validate a dynamically-created mailbox address using the "message waiting indication" (MWI) features of the CO switch 16. This check can occur in the check address process 44 or mailbox check process 46 or after the message is stored. FIG. 4 depicts such a validation process 70. The validation process 70 is performed preferably at the system level 40. The validation process 70 creates 72 an MWI packet that is sent 74 by the CU 24 to the CO switch 16 via the SMDI link. If the CO switch 16 determines that the address does not correspond to a legitimate telephone subscriber or the address corresponds to a number that should not have a mailbox (e.g. a pay telephone), the CO switch 16 returns a message (an invalid MWI packet) indicating that the address is invalid. The system 10 checks 76 this indication and, if the address is not valid, marks 78 the mailbox as disabled, thereby preventing access to the mailbox and preventing additional messages from being saved. The system also sends an alarm to a systems administrator.

Note that disabling a mailbox does not destroy any messages that are currently stored in the mailbox. This is because a problem could have been caused in the end-office (such as MWI not being enabled for the subscriber's telephone). The administrator, based on the alarm, can investigate, discover the problem and re-enable the mailbox using the conventional system administrator commands, thus permitting the subscriber to retrieve the message.

It is possible for the calling party to enter a called-party number that is in error but which passes the validation tests previously discussed. In such a situation, after a period of time sufficient for the called party to have retrieved the message, the system 10 can perform an outdial process, or other suitable notification process if the message was received over the Internet 34, to the calling party to inform the calling party with a standard message that the message has not been retrieved. This outdial notification can announce the called party's number and play the message for the calling party if desired, thereby returning the unretrieved message. The calling party can then be given the opportunity to enter a correct number or delete the message.

To ensure that only active mailboxes are retained, both a mailbox retention time (or a mailbox expiration date) for dynamically-created mailboxes and a mail retention time (or mail expiration date) for messages associated therewith can be provided. The time period for messages should be set for less than that of mailboxes. When the message retention time period expires, the message is set for deletion and the system 10 deletes (purges) the message just as saved messages are deleted at the end of their expiration period. When the mailbox retention time has elapsed, the record for the dynamically-created mailbox is deleted. If a mailbox is never accessed, and therefor never initialized, and has no messages, the mailbox is deleted. Messages that reside in mailboxes that were not dynamically created, that is, that were created by a system administrator or by the subscriber logging-in and initializing a mailbox, are not provided dynamic expiration dates. Instead, these mailboxes receive expiration dates in accordance with the conventional expiration policy configured into the system by the service provider.

The present invention has been described with respect to creating a mailbox when there is a need to store a message in the mailbox. However, any event that would modify an attribute of a mailbox, such as subscriber initialization, could trigger the creation of a mailbox where one has not been previously provisioned when dynamic mailbox creation is enabled.

The dynamic creation and storage of a message can be prevented, for example, when a telephony service subscriber (such as an elderly person) does not want voice mail service, by provisioning the mailbox and marking it disabled.

As discussed above, the present invention does not create a mailbox until some attribute of the mailbox needs to be updated (a message is to be stored/delivered, the subscriber initializes the mailbox, etc.). Prior to an attribute modification, the system presents a read only view of the mailbox to the user, but the system does not actually create the mailbox. This has the benefit of not wasting resources on a mailbox until the system knows that a mailbox is required. For example, if a call is forwarded to the system, and the mailbox does not exist, then the system will pretend (from the caller's point of view) that the mailbox exists so that the caller may leave a message. If the caller decides to abort the call, and does not leave a message, then the mailbox is not created. If the caller chooses to leave a message, however, then a mailbox is created to receive the message left. As is described previously, there are mechanisms for deleting mailboxes that were created automatically, but which the subscriber did not use during some preset amount of allotted time. This is the preferred embodiment.

However, in an alternate embodiment the system creates the mailbox immediately upon call arrival, even to provide the read access for the mailbox. In this embodiment, the mailbox will exist even if the caller does not leave a message. However, the platform can keep track of whether or not a mailbox attribute was modified during the course of the call (message deposit, subscriber initialization, etc.). If no attribute of the mailbox was modified during the course of the call, then the platform will delete the mailbox after the call is completed. While this wastes some platform resources (needlessly creating and then deleting the mailbox), it achieves a similar goal to the preferred embodiment.

In a further embodiment the system creates the mailbox immediately upon call arrival, even to provide read access for the mailbox (as in the alternate embodiment outlined above), but does not attempt to keep track of whether or not any mailbox attributes were modified during the course of the call. Instead, the system relies on the mechanism outlined in the preferred embodiment which will delete dynamically created mailboxes that are not used during the preset allotted time—and so, the mailbox created for read access—and never modified—is deleted from the system automatically at a later date. While this also wastes system resources, it postpones the impact of the delete operation to a period of low system activity, thus minimizing the system resource expense of deleting the mailbox.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating a message mailbox, comprising:
receiving a call including a message from a non-subscriber to be stored in a subscriber's mailbox;
determining, after the call is received, if a mailbox creating condition exists; and
creating the subscriber's mailbox for the message at a time that a mailbox creating condition exists and the subscriber's mailbox does not exist.

2. A method as recited in claim 1, wherein said mailbox creating condition exists when one of a time for a message to be stored and a mailbox attribute is to be modified.

3. A method as recited in claim 1, further comprising:
storing the message;
deleting the message after a message expiration time period when the message is not retrieved; and
deleting the subscriber's mailbox when the subscriber's mailbox has been dynamically created, has not been accessed and is empty for a predetermined mailbox expiration time period.

4. A method as recited in claim 1, further comprising:
storing the message; and
attempting to deliver the message by contacting an address associated with the subscriber's mailbox.

5. A method as recited in claim 1, wherein said mailbox creating conditions exists when the subscriber's mailbox passes a validity check.

6. A method as recited in claim 1, wherein said subscriber's mailbox is created after said message is stored.

7. A method of creating a message mailbox, comprising:
receiving a message to be stored;
creating a subscriber's mailbox is needed if the subscriber's mailbox does not exist; and
verifying mailbox validity by testing whether a mailbox address is authorized for a predetermined service.

8. A method as recited in claim 7, wherein said predetermined service is message waiting indication.

9. A system for creating a message mailbox, comprising:
a message processing system performing, after an interaction with a non-subscriber, an application level process that requests storage of a message and a system level process that creates a subscriber's mailbox upon the request for storage if the subscriber's mailbox does not exits.

10. A system for creating a mailbox for messages, comprising:

a message processing system performing an application level process that requests storage of a message and a system level process that creates a mailbox upon the request for storage if the mailbox does not exist, and said application level process requesting verification of the existence of a mailbox for a mailbox address and said system level process verifying existence of the mailbox when dynamic mailbox creation is enabled and a mailbox does not exist for the address.

11. A system as recited in claim 10, wherein said application level process requests associated subscriber information for a subscriber with the mailbox address and said system level process provides default subscriber information when dynamic mailbox creation is enabled and a mailbox does not exist for the address.

12. A system as recited in claim 11, wherein said mailbox is created using the default subscriber information.

13. A computer readable storage media storing a message mailbox creation process, the process determining whether a mailbox creating condition exists, and creating a mailbox after a call including a message is received from a non-subscriber at a time that the message is to be stored if the mailbox does not exist.

14. A method of creating a message mailbox, comprising:

receiving an address of a mailbox in which a message is to be stored;

overriding mailbox validation rejection and creating a subscriber record containing default information when a mailbox for the address does not exist and dynamic mailbox creation is enabled;

receiving a message to be stored;

creating a mailbox at a time that the message is to be stored using the default subscriber information and flagging the mailbox as being dynamically created;

storing the message in the mailbox;

verifying mailbox validity by testing whether a mailbox address is authorized for a message waiting indication;

issuing a message to check the mailbox when message waiting indication is not authorized;

returning the message to a sender when the message is not retrieved within a retrieval time period;

deleting the message after a message expiration time period when the message is not retrieved;

deleting the mailbox when the mailbox has been dynamically created, has not been accessed and is empty for a predetermined mailbox expiration time period; and playing the message when a request to play the message is received from the mailbox address.

15. A method of creating a message mailbox, comprising:

receiving a message to be stored from a non-subscriber for a subscriber's mailbox; and enabling a representation of the subscriber's mailbox for use at a time before the subscriber's mailbox is needed if the subscriber's mailbox does not exist.

16. A method of creating a message mailbox, comprising:

determining that a subscriber's mailbox attribute needs to be modified; and enabling a representation of the subscriber's mailbox for use at a time before the mailbox is needed for attribute modifications if the subscriber's mailbox does not exist.

17. A method of managing a message mailbox, comprising:

creating a subscriber's mailbox associated with a call by a non-subscriber if the subscriber's mailbox does not exist; and automatically deleting the subscriber's mailbox when the subscriber's mailbox is not used within a predetermined period of time.

18. A method of managing a message mailbox, comprising:

creating, associated with call arrival, a subscriber's mailbox associated with a call by a non-subscriber if the subscriber's mailbox does not exist; and deleting the subscriber's mailbox when any information associated with the subscriber's mailbox is not modified during the call.

19. A method of managing a message mailbox as recited in claim 18, further comprising deleting the subscriber's mailbox when the subscriber's mailbox is not used within a predetermined period of time.

20. A method of managing a message mailbox as recited in claim 18, further comprising deleting the subscriber's mailbox when any information stored in the subscriber's mailbox is not modified during a call.

21. A method of creating a message mailbox, comprising:

receiving a message from a non-subscriber to be stored in a subscriber's mailbox; and after the message is stored creating a subscriber's mailbox for the message if the subscriber's mailbox does not exist.

* * * * *

UNITED STATES PATENT AND TRADEMARK OFFICE
CERTIFICATE OF CORRECTION

Page 1 of 2

PATENT NO. : 6,115,455
DATED : September 5, 2000
INVENTOR(S) : Donald F. Picard

It is certified that error appears in the above-identified patent and that said Letters Patent is hereby corrected as shown below:

On the title page, item [73] Assignee, should read--
  Comverse Network Systems, Inc.--.

UNITED STATES PATENT AND TRADEMARK OFFICE
CERTIFICATE OF CORRECTION

PATENT NO.: 6,115,455
DATED : September 5, 2000
INVENTOR(S): Donald F. PICARD

It is certified that [an/error[s]] appears in the above-identified patent and that said Letters Patent is hereby corrected as shown below:

Column 8, Line 59, after "mailbox" insert --for the message at a time that the subscriber's mailbox--

Column 10, Line 18, change "modifications" to --modification--

Item [56] References Cited, insert the following acknowledged references:

| | | | |
|---|---|---|---|
| -- 5,029,2199 | 7/1991 | Wai Wong | 365/155 |
| 5,193,110 | 3/1993 | Jones et al. | 379/88X |
| 5,260,990 | 11/1993 | MeLampy et al. | 379/67 |
| 5,263,080 | 11/1993 | Jones et al. | 379/88 |
| 5,402,472 | 3/1995 | MeLampy et al. | 379/67 |
| 5,475,748 | 12/1995 | Jones | 379/211 |
| 5,493,607 | 2/1996 | Arumainayagam et al. | 379/88 |
| 5,519,766 | 5/1996 | Jones | 379/74 |
| 5,008,926 | 4/1991 | Misholi | 379/89 -- |

Signed and Sealed this

Second Day of January, 2001

Attest:

Attesting Officer

Q. TODD DICKINSON
Commissioner of Patents and Trademarks